(12) United States Patent
Tatsumi et al.

(10) Patent No.: US 6,817,450 B2
(45) Date of Patent: Nov. 16, 2004

(54) BRAKE CABLE CONNECTING APPARATUS FOR DRUM BRAKE

(75) Inventors: Yoshihiro Tatsumi, Aichi-ken (JP); Takashi Ikeda, Owariasahi (JP); Masami Fujiyama, Yokkaichi (JP)

(73) Assignee: Nisshinbon Industries Inc., Tokyo (JP)

(*) Notice: Subject to any disclaimer, the term of this patent is extended or adjusted under 35 U.S.C. 154(b) by 0 days.

(21) Appl. No.: 10/664,831

(22) Filed: Sep. 17, 2003

(65) Prior Publication Data

US 2004/0055833 A1 Mar. 25, 2004

(30) Foreign Application Priority Data

Sep. 17, 2002 (JP) ........................................ 2002-270478

(51) Int. Cl.[7] .............................................. F16D 65/14
(52) U.S. Cl. .................................. 188/2 D; 188/106 A
(58) Field of Search ........................ 188/2 D, 106 A, 188/106 F, 325, 79.56

(56) References Cited

U.S. PATENT DOCUMENTS

| | | | | |
|---|---|---|---|---|
| 2,252,860 A | * | 8/1941 | Porsche | 188/196 M |
| 4,822,197 A | * | 4/1989 | DeMartino et al. | 403/154 |
| 5,429,213 A | * | 7/1995 | Iizuka et al. | 188/79.52 |
| 5,588,335 A | * | 12/1996 | Strait | 74/512 |
| 6,318,207 B1 | * | 11/2001 | Asai et al. | 74/502.6 |
| 6,581,729 B1 | * | 6/2003 | Moriwaki | 188/2 D |

FOREIGN PATENT DOCUMENTS

| | | |
|---|---|---|
| EP | 1-041-301 A2 | 4/2000 |
| EP | 1-099-874 A1 | 5/2001 |
| EP | 174-627 A1 | 1/2002 |
| EP | 1-241-370 A1 | 9/2002 |
| JP | 2001-349360 A | 12/2001 |

* cited by examiner

Primary Examiner—Benjamin A Pezzlo
(74) Attorney, Agent, or Firm—Apex Juris, pllc; Tracy M Heims

(57) ABSTRACT

A brake cable connecting apparatus ensures prevention of brake cable disengagement by a simple structure that offers simple and accurate assemblability. The brake cable connecting apparatus comprises the strut 23 engaging with the brake shoe 12 and the plate-like brake lever engaging with the brake shoe 13. The proximal portion 24a of the brake lever 24 is pivotally positioned in the wider space 23c formed between the two facing surface walls of the strut 23. The cable end 42 of the brake cable 40 is connected with the free end 24e of the brake lever 24 by the connecting pin 43. The inner cable 41 is operated to effectuate braking, and the projection 24g of the free end 24e interferes with the resilient stopper 33 of the resilient member 30 mounted on the strut 23 and is positioned on the rotating trajection of the brake lever 24.

6 Claims, 12 Drawing Sheets

BRAKE CABLE CONNECTING APPARATUS FOR DRUM BRAKE

BACKGROUND OF THE INVENTION

1. Field of the Invention

This invention relates to a mechanical shoe expander and more particularly to a brake cable connecting apparatus for connecting a brake cable with a mechanical operating mechanism mainly comprised of a strut and a brake lever.

2. Description of Conventional Arts

A typical brake cable connecting apparatus comprises a mechanical actuator having a strut, a plate-like brake lever which is retained in the strut and which is pivotally mounted on the strut, and a pivot pin.

The mechanical actuator is positioned between a pair of brake shoes and then the strut and the brake lever as components of the mechanical actuator engage with the corresponding brake shoes. When the brake cable connected with the brake lever is operated in a cable operating direction, the brake lever rotates about a pivotally supported point with the strut. Therefore the engaging part of the strut against one brake shoe and the engaging part of the brake lever against the other brake shoe move apart from each other.

In a conventional brake cable connecting apparatus the engaging parts of the brake lever and the strut are urged to approach each other because of a spring force of a shoe return spring. Therefore, the brake lever abuts against a bridge extended between the upper portions of the two facing plates of the strut and a connecting hole of the brake lever, for setting a connecting pin therein, appears at an exterior position of the strut or at a position above an opening of the strut at a cable releasing side. (An example is shown in a paragraph 0015 of the Japanese provisional patent publication number 2001-349360.)

The brake cable is connected with the brake lever; thereafter a holder is clipped on the strut so as to set the brake lever at a certain position in the wider space of the strut.

Instead of the above conventional structure the other type of a holder may be rotatably integrated with the strut. (Refer to FIGS. 5, 6, 7, and 8 of the Japanese provisional patent publication number 2001-349360.)

OBJECT AND SUMMARY OF THE INVENTION

According to the conventional brake cable connecting apparatus, the engaging parts of the brake lever and the strut against the corresponding brake shoes move to approach each other because of the spring force of the shoe return spring, and the brake lever abuts against the bridge of the strut.

In order to establish this mechanism there needs to be sufficient clearance between each side of the anchor and each brake shoe because of manufacturing dimensional tolerances.

This clearance becomes wider when the brake cable is connected with the brake lever and becomes widest during the brake cable operation.

For the purpose of effectuating a braking force, the brake shoes need to rotate so as to fill up the clearance on either side, depending upon the rotational direction of the brake drum. Therefore, a higher impact load is applied to the anchor, thereby giving lower durability and causing an intensive impact noise.

The holder needs to be designed with sufficient size to be clipped on the outside of the strut, which increases material costs. Furthermore, in order to prevent the holder from detaching from the strut, both the holder and the strut require additional, custom fitting features, which also increases the manufacturing costs thereof.

The conventional separate holder is inconvenient for handling and has the possibility of getting lost.

If the conventional holder is integrated with the strut a rotational axis needs to be employed therebetween, which further increases the costs.

The holder needs to be pushed and clipped on the strut to attach to the strut when the brake cable is connected with the brake lever. The holder needs to rotate in order to establish the attachment to the strut after the brake cable is connected with the brake lever. Therefore, the conventional structure requires more work process.

In addition, employing the separate holder creates the possibility that an attaching work of the holder is accidentally omitted. Employing the integrated holder creates the possibility of failing to rotate the same and further creates the possibility of being attached in an inappropriate position if misassembled.

This invention is made to improve the above-points and to provide a brake cable connecting apparatus with a simple structure offering a simple and accurate ability to assemble.

In order to achieve the above-objectives, this invention presents a brake cable connecting apparatus of a brake actuating mechanism for a drum brake, the brake actuating mechanism comprises: a strut engaging with one brake shoe and a brake lever positioned in a space formed between two facing surface walls of the strut and engaging with the other brake shoe; a proximal end of the brake lever is pivotally supported between the two facing surface walls of the strut while a brake cable is connected to a free end of the brake lever by a connecting pin and the brake actuating mechanism moves the brake shoes away from each other as a result of relative rotation of the strut and brake lever about a pivotally supporting point therebetween by operation of the brake cable, wherein a resilient member is provided on a rotating trajection of the brake lever relative to the strut; when the brake lever, at an external position out of the space of the strut where the connecting pin can link the brake cable and the brake lever, rotates and moves in a cable operating direction, either the brake lever or the strut deforms the resilient member to allow the free end of the brake lever to pass into the internal position in the space of the strut thereby securing the linkage of the connecting pin, the brake lever, and the strut, and thus preventing removal of the connecting pin; and when the brake lever at the internal position rotates and moves in a cable releasing direction, either the brake lever or the strut abuts against the resilient member thereby inhibiting the brake lever from rotating in the cable releasing direction.

The brake cable connecting apparatus described above can provide a simple connection between the free end of the brake lever and the brake cable by the connecting pin.

By simply positioning the resilient member on the rotating trajection of the brake lever this allows the brake lever to be at a position enabling the connecting pin to link the brake cable and the free end of the brake lever.

Further, after the brake cable is connected to the free end of the brake lever by the connecting pin, the resilient member, as a result of only operating the brake cable, can prevent disengagement of the brake cable from the brake lever. This structure can also eliminate the possibility of omitting a manual attaching work of the holder.

Furthermore, there is no need to add processes to make particular features either on the brake lever or the strut for mounting the resilient member. The brake cable connecting apparatus as described above may have the resilient member installed in the strut.

This disclosure facilitates the mounting work of the resilient member on the strut. The brake cable connecting apparatus as described above may have the resilient member installed in the brake lever.

This disclosure facilitates the mounting work of the resilient member on the brake lever. The brake cable connecting apparatus as disclosed above may be such that an operating portion that makes the resilient member deform is formed on the resilient member, when the operating portion is operated while rotating the brake lever in the cable releasing direction from the interior position to the exterior position, an abutment of the brake lever or the strut against the resilient member is released, thereby permitting a passage of the free end of the brake lever.

This disclosure facilitates disengaging the brake cable from the brake lever. The resilient member can be deformed as a result of only operating the operating portion. Therefore, the brake cable can be taken away from the brake lever.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF PREFERRED EMBODIMENT

A brake cable connecting apparatus of this invention will be explained below.

Example 1 of this invention will be explained with reference to FIGS. 1–6.

Figure 1:
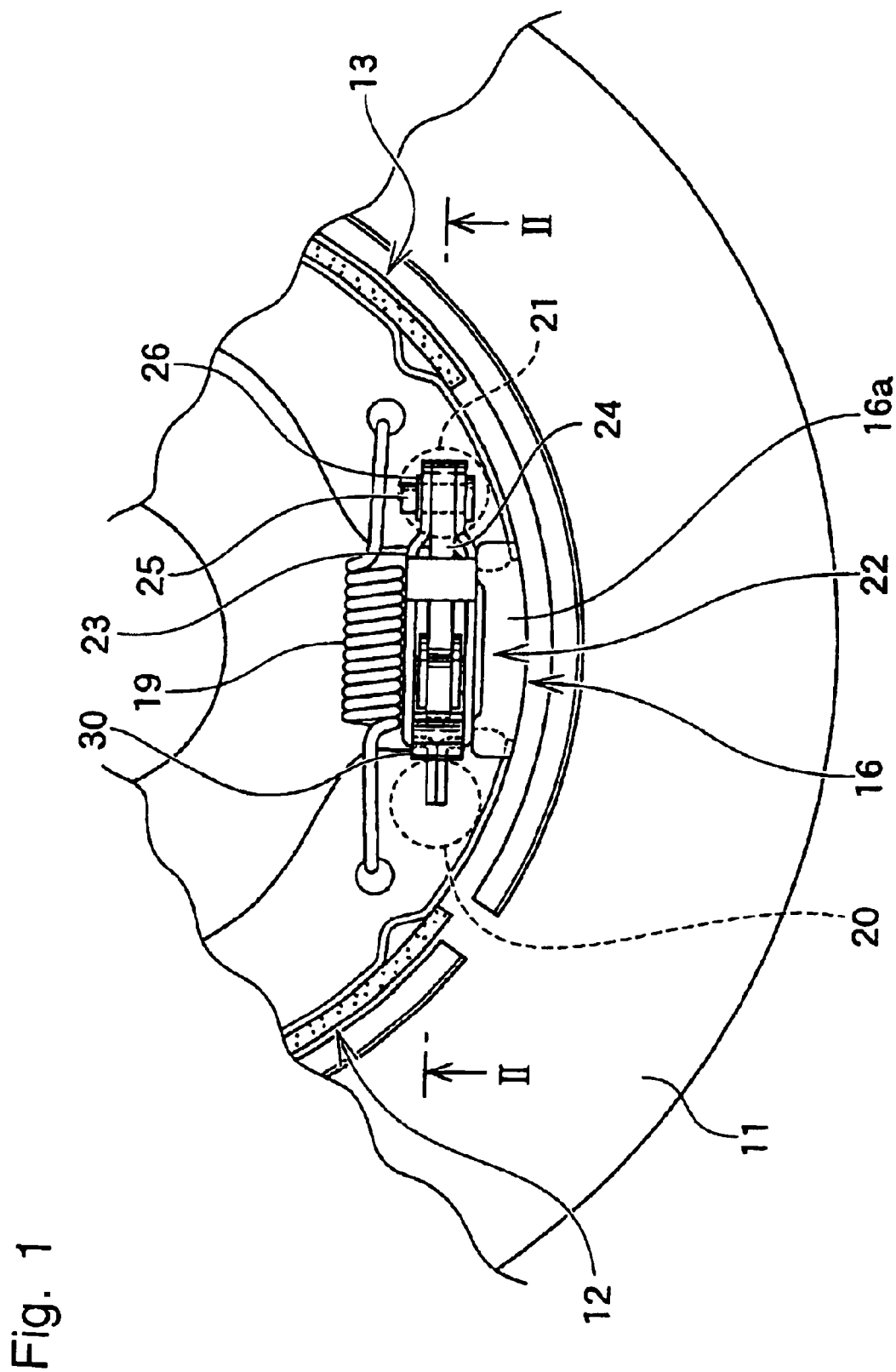
FIG. 1 is a plan view showing an example of the drum brake employing the brake cable connecting apparatus of Example 1.

Terms, "upper" and "lower" and "right" and "left" in this example are explained with reference to FIG. 1 unless specifically stated otherwise.

A pair of brake shoes 12 and 13 is moveably supported on a back plate 11 fixed to a stationary part 10 of a vehicle body by a shoe hold mechanism (not shown in the figures). Lower ends of the brake shoes are supported by a wall portion 16a of an anchor 16 and upper adjacent end thereof (not shown in the figures) are connected by a connecting mechanism (not shown in the figures). One shoe return spring (not shown in the figures) is extended between the upper ends of the brake shoes 12 and 13, which maintains an abutment between the connecting mechanism and the upper ends of the brake shoes 12, 13, while lower shoe return spring 19 is extended between the lower ends of the brake shoes 12 and 13, which maintains an abutment between the lower ends of the brake shoes 12, 13 and the anchor 16.

A mechanical actuator 22, extending between the lower adjacent ends of the brake shoes 12 and 13, comprises a strut 23, a brake lever 24, a pivot pin 25, and a washer 26 and is positioned between both brake shoes 12 and 13 adjacent to the wall portion 16a of the anchor 16.

The strut 23 has two facing surfaces with a space therebetween. The brake lever 24 is positioned in the space of the strut 23 and a resilient member 30, restricting rotational movement of the brake lever 24 in both rotational directions, is mounted on the left side within the space of the strut 23.

The anchor 16 comprises the aforesaid wall portion 16a and a base 16b, together making an L shape in cross section. The base 16b is fixed to the stationary part 10 of the vehicle with the back plate 11 by insertion bolts 20, 21.

Figure 3:
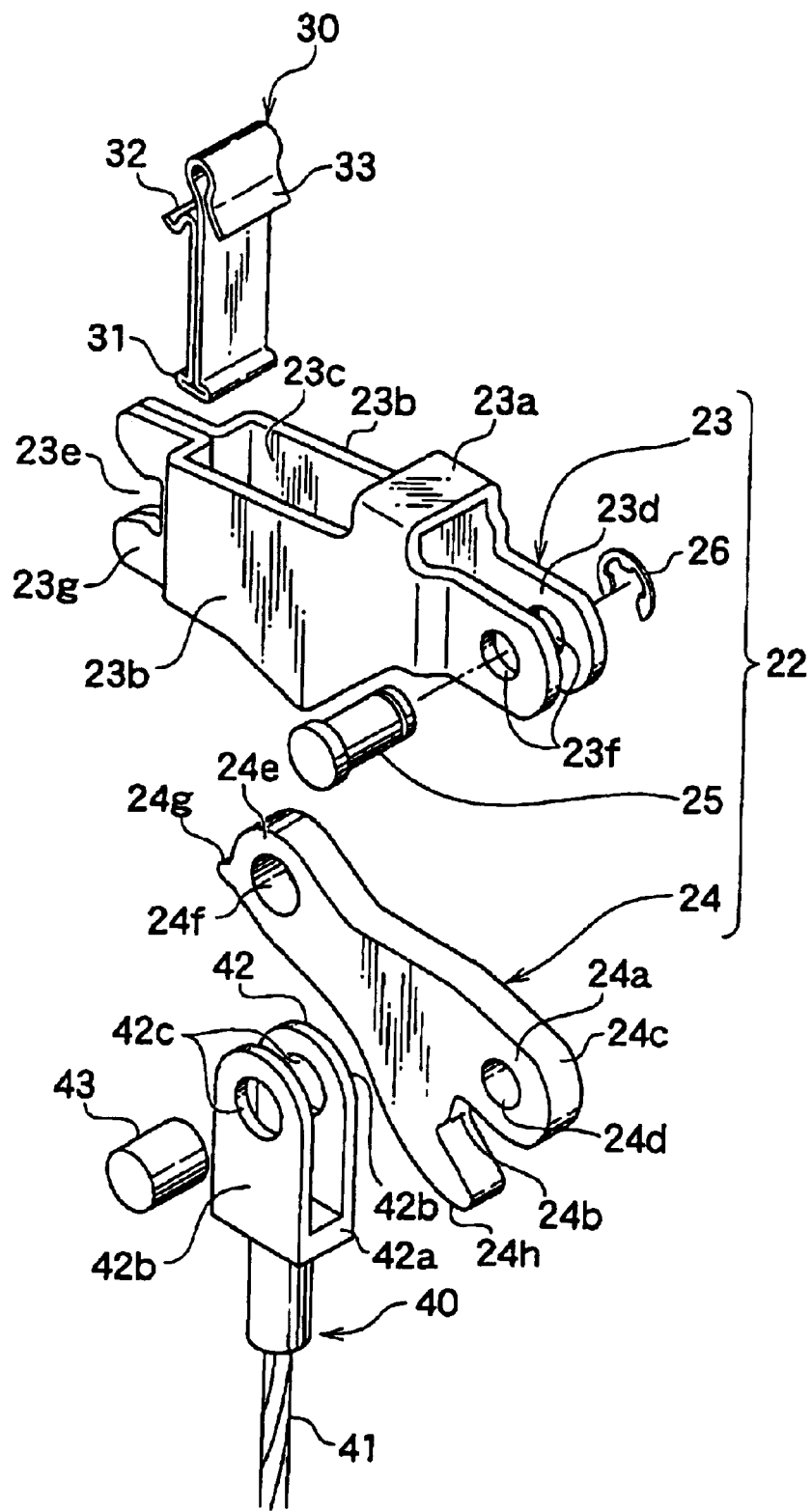
FIG. 3 is an exploded isometric view of the brake cable connecting apparatus of Example 1.

FIG. 3 is an exploded isometric view showing the mechanical actuator 22, the resilient member 30, a brake cable 40, and a connecting pin 43. Components of them will be explained with reference to FIG. 3.

The strut 23 as a component of the mechanical actuator 22 is made of a piece of plate, which is folded to make a U-shape thereby forming the two facing surface walls 23b and further, has a bridge 23a at an upper portion thereof in FIG. 3.

Left ends of the two facing surface walls 23b are superposed on each other and are to be fixed, such as by welding. A wider space 23c exists at a central region of the strut 23 in a longitudinal direction between the two facing surface walls 23b and a narrower space 23d exists at a right side of the strut 23 in the longitudinal direction between the two facing surface walls 23b.

Left end portion of the two facing surface walls 23b have shoe engagement grooves 23e, while right end portion of the two facing surface walls 23b have pivot holes 23f.

An inner surface walls forming the wider space 23c at a superposed portion side is reserved for the resilient member 30 to be clipped.

The brake lever 24 as a component of the mechanical actuator 22 is made of a piece of plate and is positioned and retained in the space 23c, 23d of the strut 23.

A proximal portion 24a at a right side of the brake lever 24 has a shoe engagement groove 24b. A protrusion 24c, immediately forming above the shoe engagement groove 24b, has a pivot hole 24d though which the pivot pin 25 penetrates. A washer 26 is clipped on the top of the pivot pin 25 penetrating through one of the pivot holes 23f, the pivot hole 24d, and the other of the pivot holes 23f, so that the brake lever 24 is pivotally supported relative to the strut 23.

Figure 2:
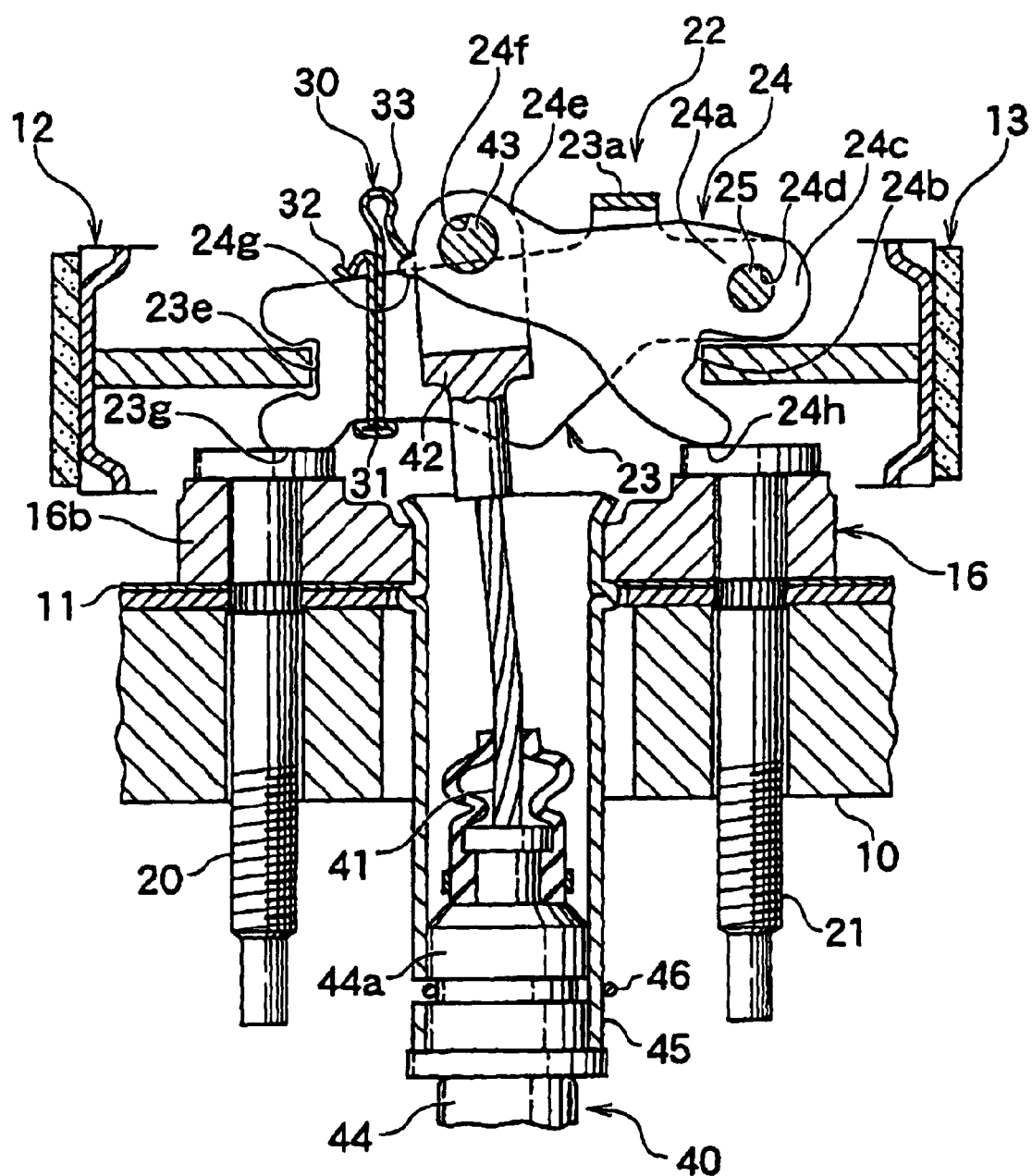
FIG. 2 is a cross-section view taken along the line II—II of FIG. 1.

A clockwise rotation of the brake lever 24 according to FIG. 2 is restricted because of abutting an upper end surface of the brake lever 24 against the bridge 23a of the strut 23.

A free end 24e at the left side of the brake lever 24 has a connecting hole 24f to connect the cable end 42, fixed on the tip of an inner cable 41, together making the brake cable 40, by the connecting pin 43. A projection 24g is formed on the peripheral surface of the free end 24e interfering with the later described resilient member 30 while rotating the brake lever 24.

The strut 23 and the brake lever 24, both components of the mechanical actuator 22, have protrusions 23g and 24h at the cable operating side, which abut against heads of the insertion bolts 20 and 21, respectively.

After the cable end 42 is connected with the brake lever 24 by the connecting pin 43 while the free end 24e of the brake lever 24 is positioned at an exterior position above the opening of the strut 23, the resilient member 30 is deformed to allow the free end 24e to move from the exterior position of the strut 23 to an interior position of the strut 23 when the brake lever 24 rotates in the cable operating direction. Once the brake lever 24 passes by a certain point relative to the strut 23, the resilient member 30 interferes the brake lever 24 and prevents the brake lever 24 from rotating back in a cable releasing direction. This example describes a situation when the resilient member 30 is mounted on the strut 23.

The resilient member 30 of this example is made from a strip of spring steel with a bit narrower width than a width of the wider space 23c of the strut 23 by bent. The resilient member 30 has a pair of clipping strips 31 and 32 clipping on top and bottom surfaces of the strut 23 in FIG. 3 after the clipping strip 31 passes through the wider space 23c. The resilient member 30 also has a resilient stopper 33 projecting at the side of the bridge 23a within the wider space 23c on a rotating trajection of the projection 24g of the brake lever 24.

Figure 4:
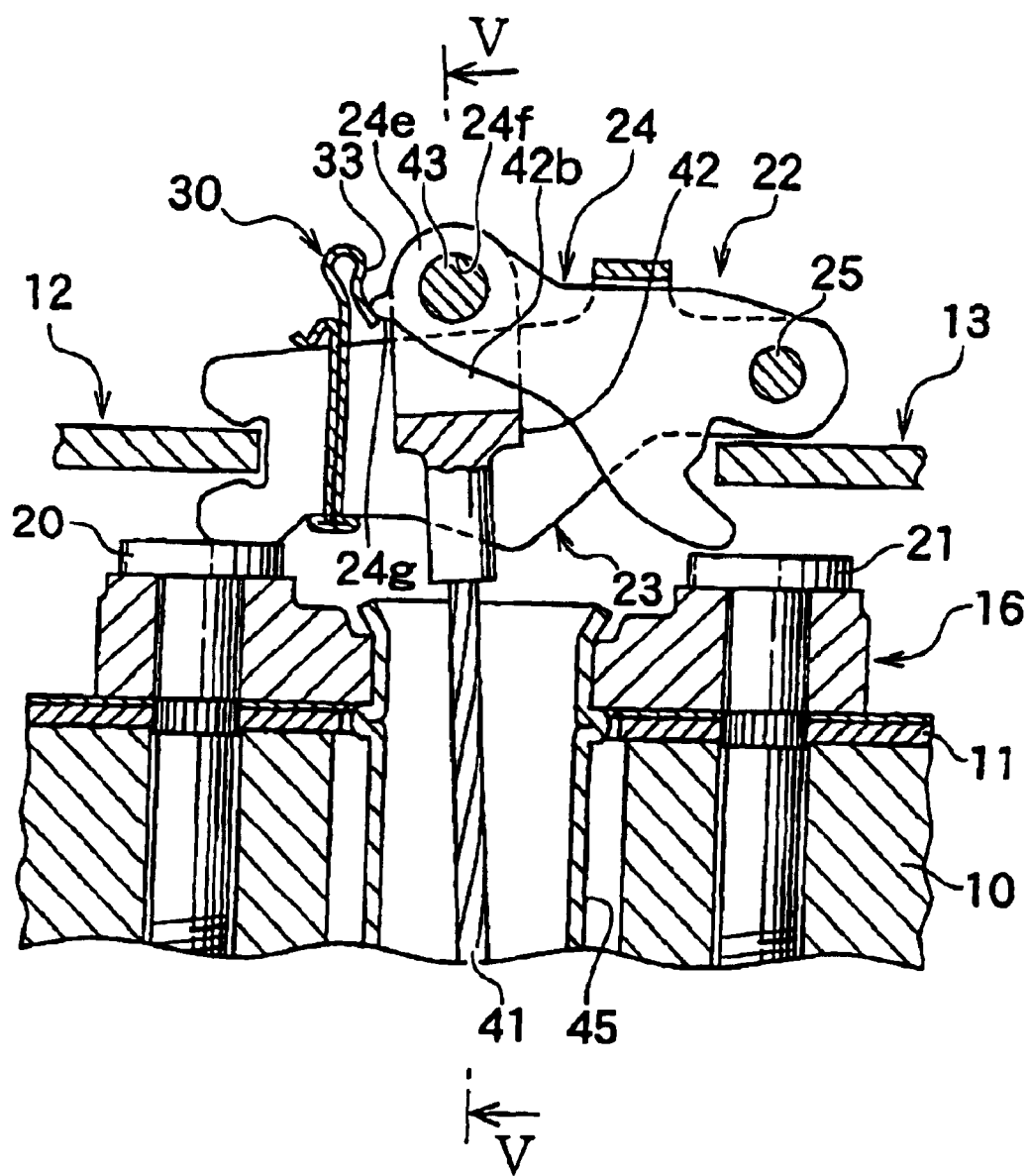
FIG. 4 is a view explaining operation of the mechanical actuator of Example 1 and explaining a condition where the connecting hole of the free end of the brake lever appears above the opening of the space formed in the strut at the cable releasing side.
Figure 6:
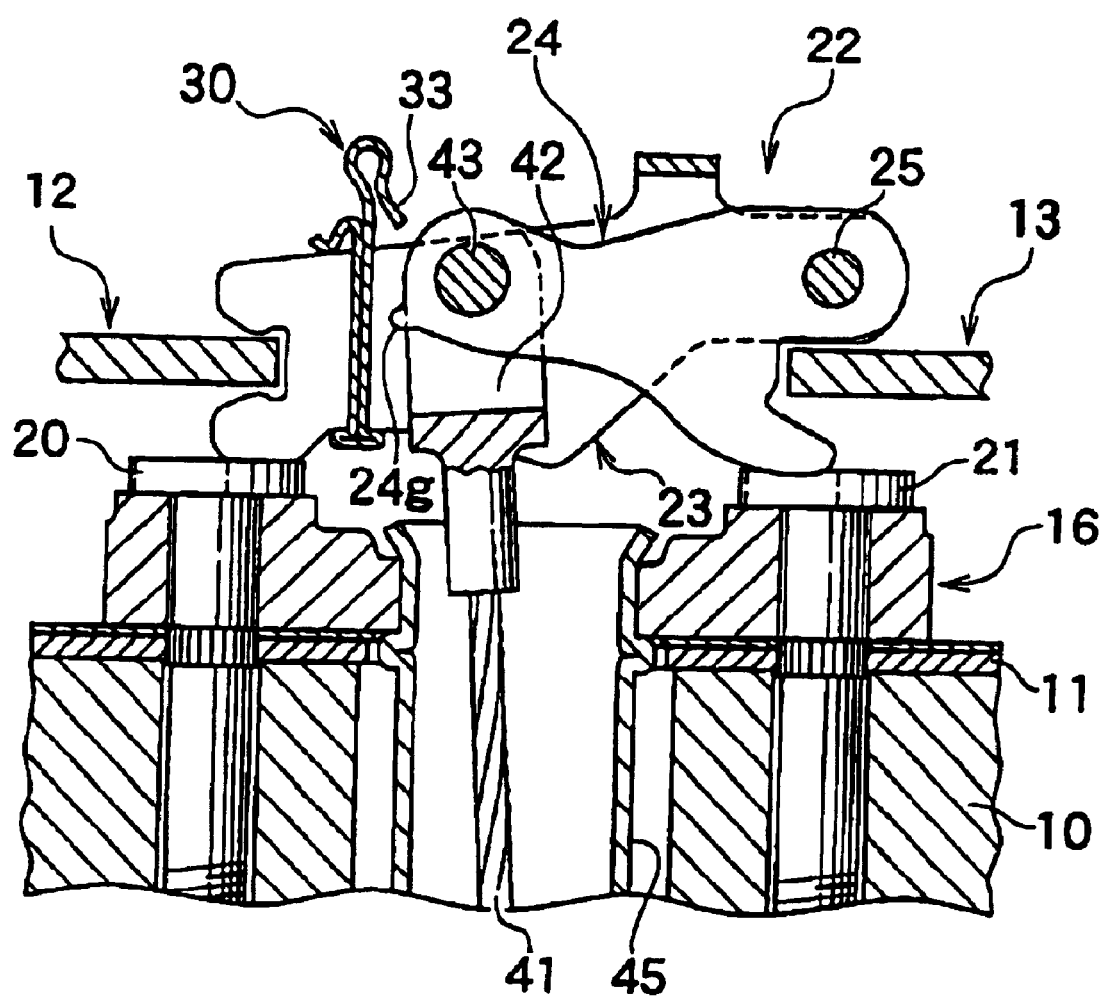
FIG. 6 is a view explaining operation of the mechanical actuator of Example 1 and explaining a condition where the inner cable is operated to pass the connecting hole of the free end of the brake lever into the space of the strut.

In the concrete, while the projection 24g of the brake lever 24 is positioned at the cable releasing side relative to a point of abutment with the resilient member 30, the connecting hole 24f formed on the free end 24e of the brake lever 24 appears at the exterior position of the strut 23 (as shown in FIG. 4). While the brake lever 24 is being rotated in the cable operating direction and the connecting hole 24f thereon is being moved into the wider space 23c (the interior position) of the strut 23, the projection 24g of the brake lever 24 deforms the resilient stopper 33 of the resilient member 30 allowing the free end 24e to pass into the wider space 23c (the interior position) of the strut 23 (as shown in FIG. 6). The resilient member 30 is set to bring the resilient stopper 33 on the rotating trajection of the brake lever 24 causing an interference with the projection 24g, so that after the projection 24g passes beyond the resilient stopper 33, the resilient stopper 33 returns to an initial position, and the projection 24g abuts against the resilient stopper 33 when the brake lever rotates back in the cable releasing direction, thereby preventing the free end 24e from passing back beyond the resilient stopper 33 (as shown in FIG. 2).

The clipping force of the pair of clipping strips 31 and 32 is set to bear vibration while driving the vehicle and also to prevent clip 30 from disengaging from the strut 23 by any external forces when the projection 24g of the brake lever 24 passes beyond the resilient stopper 33.

The brake cable 40 disclosed in FIGS. 2 and 3 is comprised of the inner cable 41, an outer casing 44 and another parts, and one end at the drum brake side is structured as follows.

A guide pipe 45 has one and the other ends, the one end is fixed on the base 16b of the anchor 16 and the other end extends through the back plate 11 and the stationary part 10 of the vehicle.

One end of the brake cable 40 is inserted into the guide pipe 45 and a casing cap 44a of the outer casing 44 fits in the other end of the guide pipe 45 and is clipped by a ring 46.

The cable end 42 fixed on the tip of the inner cable 41 has two parallel extension surfaces 42b projecting from a proximal portion 42a, which face each other and are spaced for retaining the brake lever 24 therebetween and have connecting holes 42c to set the connecting pin 43.

The free end 24e of the brake lever 24 is put between the extension surfaces 42b, the connecting holes 42c and the connecting hole 24f are aligned and connecting pin 43 penetrates therethrough.

A process of connecting the brake cable will be explained next.

Prior to connecting the brake cable 40 with the drum brake, the position of the brake lever 24 relative to the strut 23 (a position of the projection 24g of the brake lever 24 relative to the resilient stopper 33 of the resilient member 30 mounted on the strut 23) is set at an initial position shown in FIG. 4. The rotational range of the brake lever 24 is restricted to a limited range between a point where the projection 24g abuts against the resilient stopper 33 and a point where a central region of the brake lever 24 abuts against the bridge 23a of the strut 23.

The free end 24e of the brake lever 24 is positioned above the wider space 23c of the strut 23 at the cable releasing side and the connecting hole 24f appears at the exterior position of the strut.

When the inner cable 41 is manually inserted in the guide pipe 45, the cable end 42 fixed on the tip of the inner cable 41 travels through the wider space 23c of the strut 23 and reaches the free end 24e of the brake lever 24.

Figure 5:
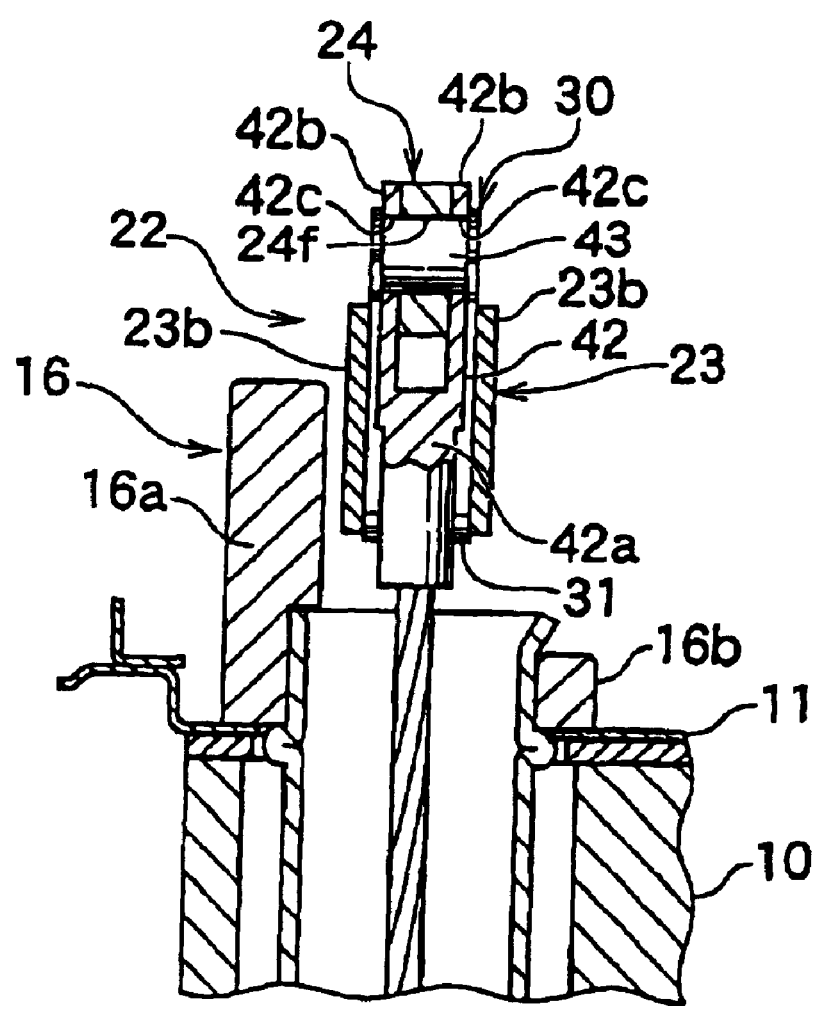
FIG. 5 is a cross-section view taken along the line V—V of FIG. 4.

The free end 24e of the brake lever 24 is retained between the two extension surfaces 42b formed on the cable end 42, and the connecting holes 42c, 24f, and 42c are aligned so that connecting pin 43 will penetrate therethrough to link the brake lever 24 and the cable end 42 as shown in FIGS. 4 and 5.

Thereafter, when the inner cable 41 is operated, the projection 24g of the brake lever 24 deforms the resilient stopper 33 of the resilient member 30 backward while the brake lever 24 rotates in the cable operating direction, and the projection 24g finally passes beyond the resilient stopper 33 as shown in FIG. 6.

After the projection 24g passes beyond the resilient stopper 33, the casing cap 44a of the outer casing 44 is fixed on the other end of the guide pipe 45 by the ring 46.

Accordingly, after that if the brake lever 24 attempts to rotate in the cable releasing direction, the resilient stopper 33 of the resilient member 30, now returned from the deformed state to the initial position, interferes with the projection 24g. Because the resilient stopper 33 can hardly be deformed in the cable releasing direction, thereby preventing the brake lever 24 from rotating in the cable releasing direction as shown in FIG. 2.

Therefore, the connecting pin 43 remains in the wider space 23c (the interior position) of the strut 23, and then the free end 24e of the brake lever 24 can not return to its initial position. Accordingly, the cable end 42 fixed on the tip of the inner cable 41 can not inadvertently be disengaged from the brake lever 24 while transporting the drum brake.

If the cable end 42 needs to be disengaged from the brake lever 24 to replace the brake cable 40, the brake lever 24 is rotated in the cable releasing direction while manually deforming the resilient stopper 33 backward with a tool or the like, the connecting pin 43 can easily be taken away.

The brake cable connecting apparatus of Example 2 of this invention will be explained with reference to FIGS. 7–9. This Example 2 is an embodiment where the resilient member 50 is clipped on the bridge 23a of the strut 23 and the projection 24g is formed on an outside surface around the proximal portion 24a of the brake lever 24.

Figure 9:
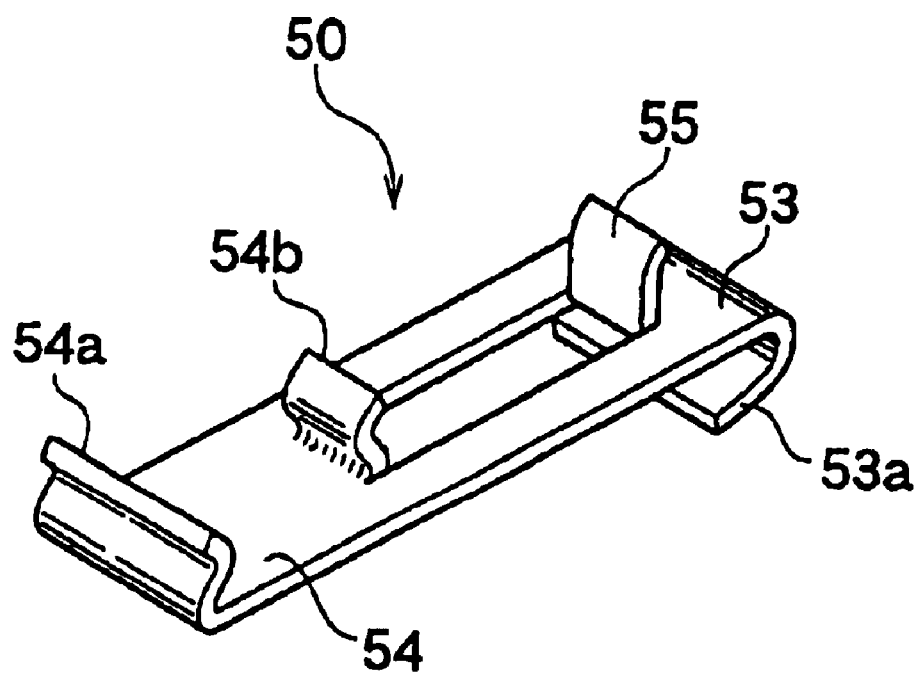
FIG. 9 is an isometric view of the resilient member of Example 2.

The resilient member 50 employed in this example is made of a strip of spring steel, and as shown in FIG. 9 a first clipping strip 54a and a second clipping strip 54b are formed by press on a proximate portion 54 at the left side of the resilient member 50. The first and second clipping strips 54a and 54b are used to grab the bridge 23a.

A resilient stopper 53 is extended at a right side of the resilient member 50 and is curved in the opposite direction relative to the first clipping strip 54a to form a rigid end 53a. The rigid end 53a sufficiently extends to interfere with the projection 24g at the proximate portion of the brake lever 24.

Furthermore, an operation strip 55 is formed on the resilient stopper 53 of the resilient member 50 so as to face the second clipping strip 54b.

Figure 7:
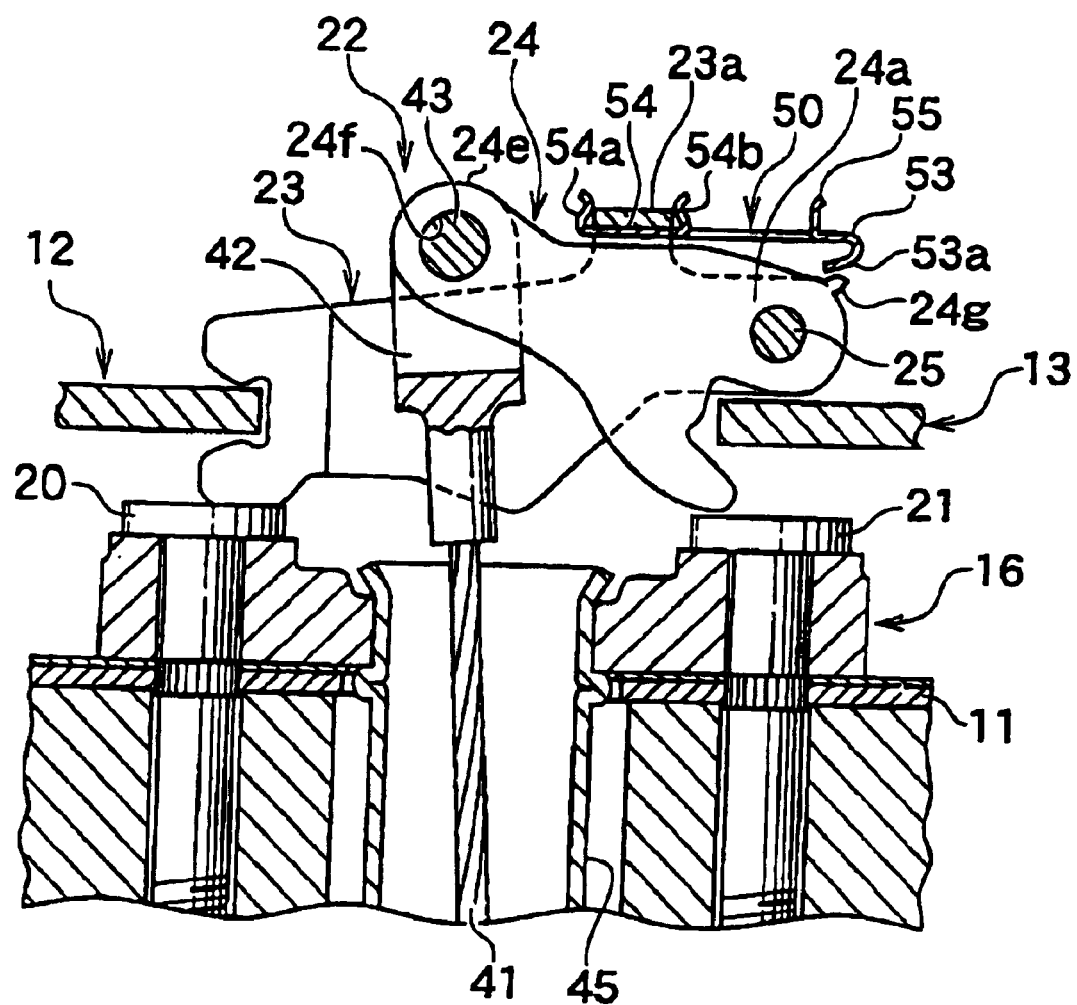
FIG. 7 is a view explaining the structure of the brake cable connecting apparatus of Example 2 and explaining a condition where the connecting hole of the free end of the brake lever appears above the opening of the space formed in the strut at the cable releasing side.

FIG. 7 shows a condition where the cable end 42 is connected with the brake lever 24, the first and second clipping strips 54a and 54b of the resilient member 50 are attached to the bridge 23a of the strut 23, and the rigid end 53a of the resilient stopper 53 extends at a side of the proximal portion 24 of the brake lever 24.

A position of the projection 24g of the brake lever 24 relative to the rigid end 53a of the resilient member 50 is such that the connecting hole 24f entirely appears at the exterior position of the strut 23 until the projection 24g passes beyond the rigid end 53a.

While the cable end 42 of the tip of the inner cable 41 is connected with the free end 24e of the brake lever 24 by the connecting pin 43, in case of operating the inner cable 41, as the projection 24g of the brake lever 24 deforms the resilient stopper 53 of the resilient member 50 backward, the brake lever 24 rotates in the cable operating direction to finally lead the projection 24g to pass beyond the rigid end 53a.

Figure 8:
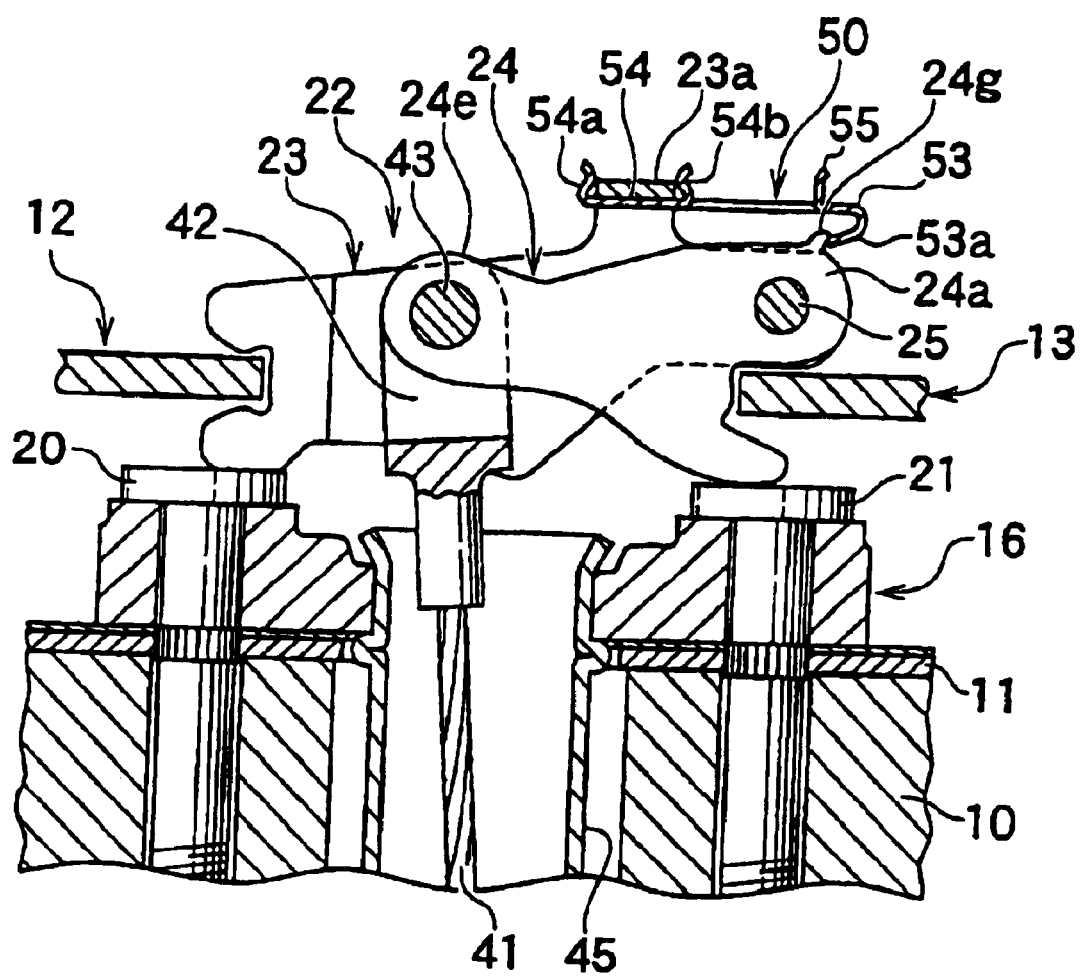
FIG. 8 is a view explaining the operation of the mechanical actuator of Example 2 and explaining a condition where the inner cable is operated to pass the connecting hole of the free end of the brake lever into the space of the strut, thereby preventing the brake lever from rotating in the cable releasing direction.

After the projection 24g passes beyond the rigid end 53a, the outer casing (not shown in the figures) is fixed on the guide pipe 45, and then if the brake lever 24 attempts to rotate in the cable releasing direction, the projection 24g interferes with the rigid end 53a of the resilient stopper 53, now returned from the deformed state, thereby preventing the rotation of the brake lever 24 in the cable releasing direction as shown in FIG. 8.

Compared with Example 1, this example is more economical because it uses less spring steel to form the resilient member 50.

If the cable end 42 needs to be disengaged from the free end 24e of the brake lever 24 to replace the brake cable 40, the connecting hole 24f of the brake lever 24 is positioned at the exterior position of the strut 23 while manually deforming the resilient stopper 53 backward by using the operation strip 55. Also, the connecting pin 43 can easily be taken away.

However, the operation strip 55 is not a prerequisite of this example. For example, the resilient stopper 53 may be deformed with fingers by pinching both side surfaces of the resilient stopper 53.

The brake cable connecting apparatus relating to Example 3 of this invention will be explained with reference to FIGS. 10–12.

Figure 11:
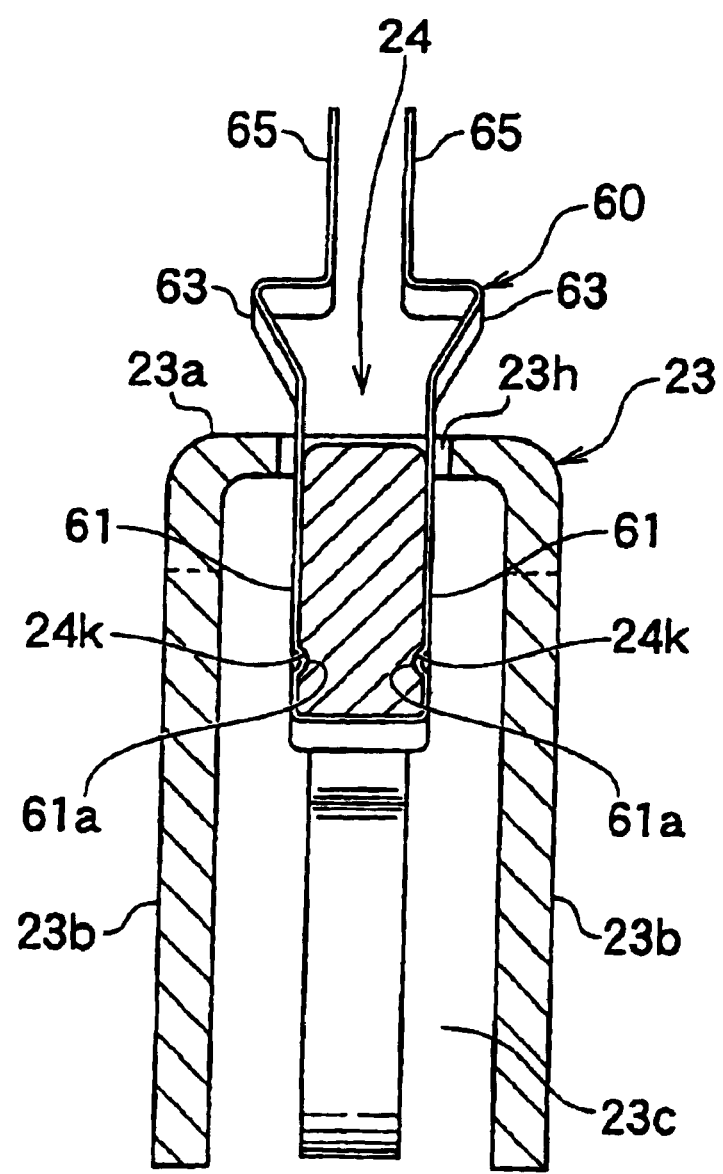
FIG. 11 is a cross-section view of FIG. 10 taken along the line XI—XI.

As shown in FIG. 11, Example 3 is an embodiment where a resilient member 60, made by bending a piece of spring steel, is mounted on the brake lever.

The resilient member 60 of this example is comprised of a pair of clipping strips 61, capable of being attached on the outside of the brake lever 24 at the central region, a pair of resilient strips 63 projecting from the clipping strips 61 and tapered to gradually be wider toward the free end (upper end in FIG. 11), and a pair of operation ends 65 extending from the resilient strips 63 and parallel to the clipping strips 61.

A projection 61a is formed on each facing surface of the pair of clipping strips 61 to fit in each concave section 24k, formed at each side of the brake lever 24. The resilient member 60 is set in an initial position after fitting the projections 61a in the concave sections 24k.

For example, the concave sections 24k formed at both sides of the brake lever 24 can be produced at the time the connecting hole 24f or the pivot hole 24d are formed simply with a die change, thereby eliminating an extra process.

The bridge 23a of the strut 23 has a notch 23h. The resilient member 60 is attached to the brake lever 24 at the central region, and the resilient strips 63 are positioned outside of the notch 23h (the cable release side).

Figure 10:
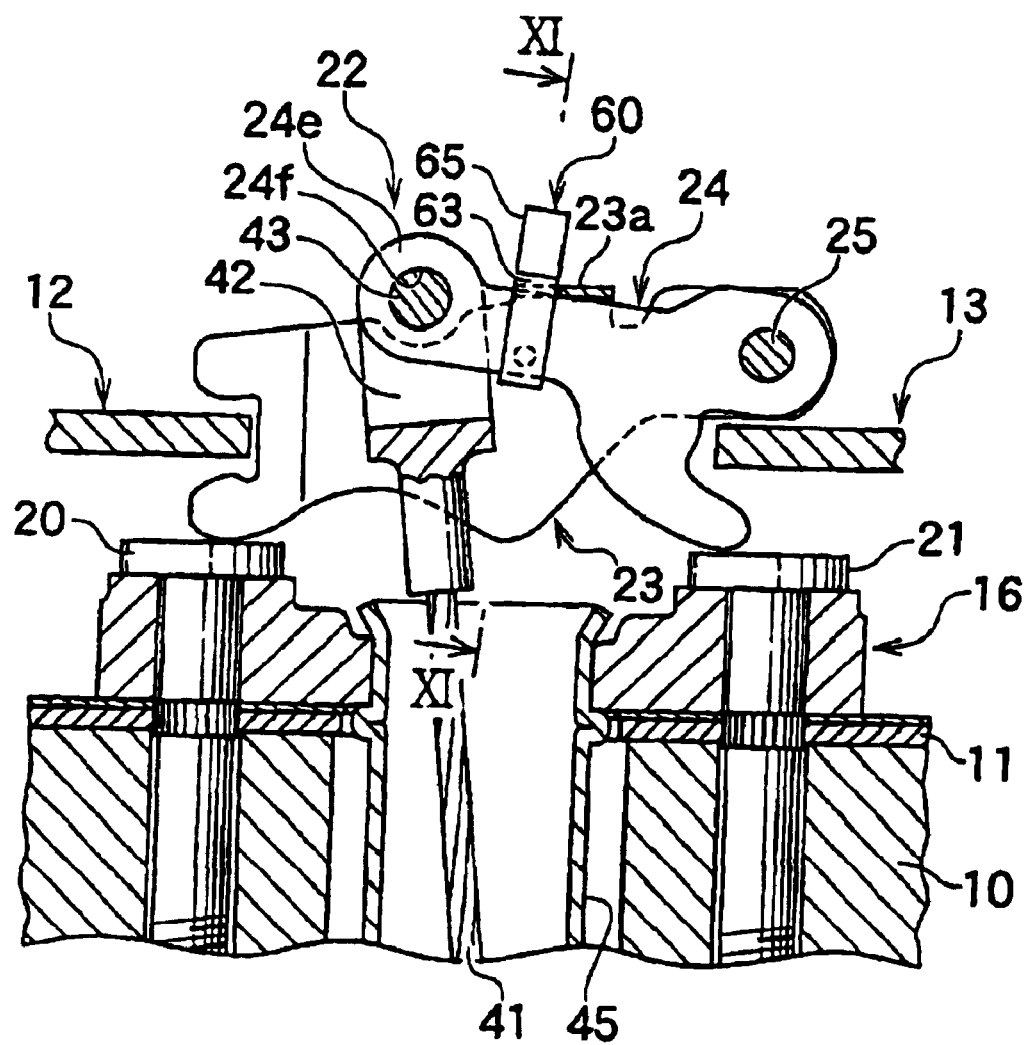
FIG. 10 is a view explaining the structure and operation of the brake cable connecting apparatus of Example 3 and explaining a condition where the connecting hole of the free end of the brake lever appears above the opening of the space formed in the strut at the cable releasing side.

As shown in FIG. 10, the connecting hole 24f of the brake lever 24 entirely appears at the exterior position of the strut above the opening of the wider space 23c. The cable end 42 is connected with the free end 24e of the brake lever 24 by the connecting pin 43, and in the case where the brake lever 24 rotates in the cable operating direction, the tapered resilient strips 63 of the resilient member 60, as shown in FIG. 11, are deformed inward as they slide on the side surface of the notch 23h, formed on the bridge 23a, allowing the brake lever 24 to pass into the wider space 23c (the interior position) in the cable operating direction in order to reach the condition shown in FIG. 12.

Figure 12:
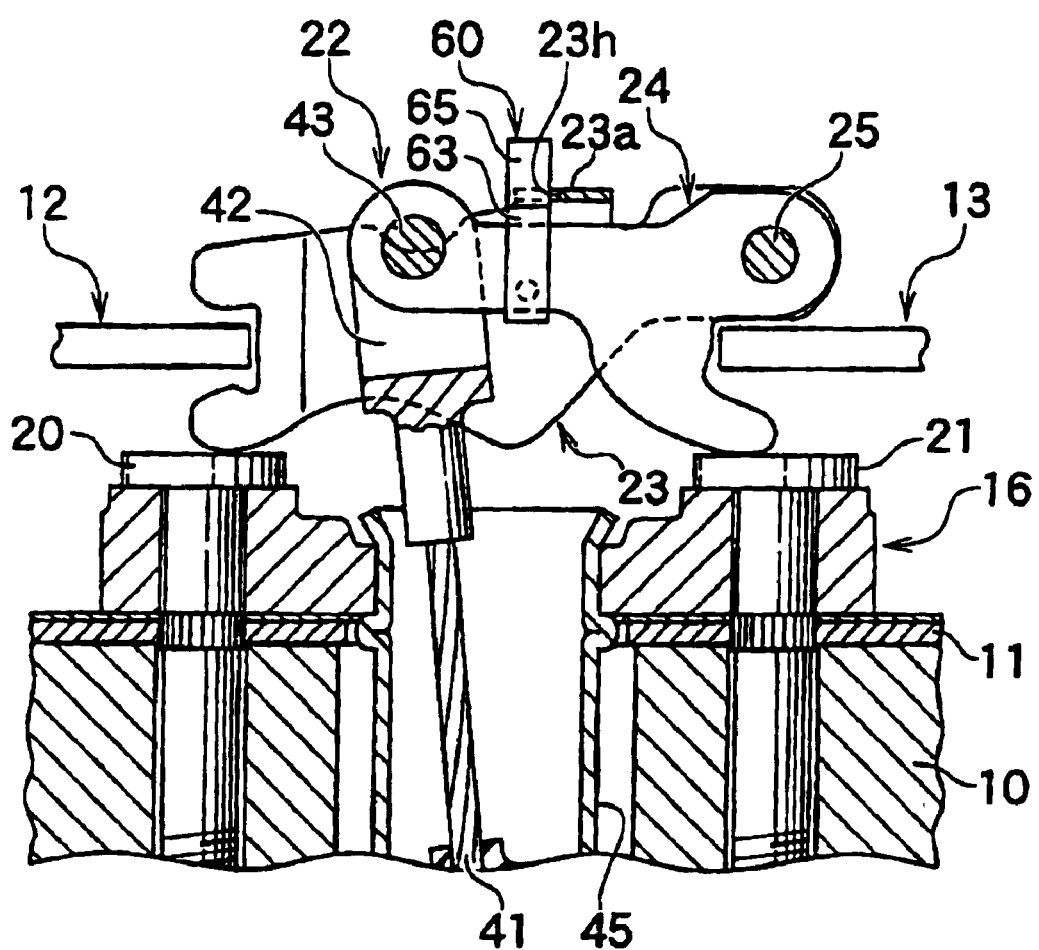
FIG. 12 is a view explaining the operation of the mechanical actuator of Example 3 and explaining a condition where the inner cable is operated to pass the connecting hole of the free end of the brake lever into the space of the strut, thereby preventing the brake lever from rotating in the cable releasing direction.

Once the resilient strips 63 pass beyond the bridge 23a to reach the condition of FIG. 12, if the brake lever 24 attempts to rotate in the cable releasing direction, the resilient strips 63 returned from the deformed state to the initial portion interfere with an inner surface of the bridge 23a, thereby preventing the free end 24e of the brake lever 24 from passing toward the exterior position at the cable releasing side as shown in FIG. 12.

If the cable end 42 needs to be disengaged from the free end 24e of the brake lever 24 to replace the brake cable, the brake lever 24 is rotated in the cable releasing direction so that the connecting hole 24f entirely appears at the exterior of the strut 23 while manually deforming the resilient strips 63 backward by pinching the pair of operation ends 65 of the resilient member 60 projecting from the strut 23 by fingers, the connecting pin 43 can easily be taken away.

In this example, when the brake lever 24 rotates in the cable releasing direction, the resilient strips 63 of the resilient member 60 interfere with the strut 23 at two locations, thereby ensuring a pin disengagement prevention function while the drum brake is being transported and increasing efficiency in disengaging the connection between the free end 24e of the brake lever 24 and the cable end 42.

In addition, the above-description gave an example of the mechanical actuator 22 mounted on top surfaces of the insertion bolts 20 and 21 which fix the anchor 16 in a duo-servo type drum brake device. However, applications of this invention are not limited to the above-described patterns and, for example, the mechanical actuator 22 can directly be mounted on the back plate 11 if the anchor 16 is an anchor pin type.

This invention is not limited to Examples 1–3. The minimum requirement is that when the bake lever, at an external position out of the space formed between the two facing surface falls of the strut where the connecting pin can link the brake cable and the brake lever, rotates and moves in a cable operating direction, either the brake lever or the strut deforms the resilient member to allow the free end of the brake lever to pass into the internal position in the space formed between two facing plate surfaces of the strut thereby securing the linkage of the connecting pin, the brake lever, and the strut, and thus preventing removal of the connecting pin. Furthermore, when the brake lever at the internal position rotates and moves in a cable releasing direction, either the brake lever or the strut abuts against the resilient member thereby inhibiting the brake lever from rotating in the cable releasing direction.

This invention provides a simple structure by adding the above-described resilient member so as to allow easy brake cable connecting operation.

Also, this invention can certainly prevent disengagement of the brake cable from the brake lever and will thereby eliminate the process of manually engaging the holder.

Furthermore, this invention does not require an extra process to form the brake lever and the strut.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What we claim is:

1. A brake cable connecting apparatus of a brake actuating mechanism for a drum brake, said brake actuating mechanism comprises:
    a strut engaging with one brake shoe and a brake lever positioned in a space formed between two facing surface walls of said strut and engaging with the other brake shoe;
    a proximal end of said brake lever is pivotally supported between said two facing surface walls of said strut while a brake cable is connected to a free end of said brake lever by a connecting pin and
    said brake actuating mechanism moves said brake shoes away from each other as a result of relative rotation of said strut and brake lever about a pivotally supporting point therebetween by operation of said brake cable, wherein
    a resilient member is provided on a rotating trajection of said brake lever relative to said strut;
    when said brake lever, at an external position out of said space of said strut where the connecting pin can link the brake cable and the brake lever, rotates and moves in a cable operating direction, either said brake lever or said strut deforms said resilient member to allow the free end of the brake lever to pass into the internal position in said space of the strut thereby securing the linkage of said connecting pin, said brake lever, and said strut, and thus preventing removal of said connecting pin; and
    when said brake lever at said internal position rotates and moves in a cable releasing direction, either said brake lever or said strut abuts against said resilient member thereby inhibiting said brake lever from rotating in the cable releasing direction.

2. The brake cable connecting apparatus of claim 1, wherein said resilient member is installed on said strut.

3. The brake cable connecting apparatus of claim 1, wherein said resilient member is installed on said brake lever.

4. The brake cable connecting apparatus as in claim 1, in which an operating portion that makes said resilient member deform is formed on said resilient member, when said operating portion is operated while rotating said brake lever in said cable releasing direction from said interior position to said exterior position, an abutment of said brake lever or said strut against said resilient member is released, thereby permitting a passage of said free end of said brake lever.

5. The brake cable connecting apparatus as in claim 2, in which an operating portion that makes said resilient member deform is formed on said resilient member, when said operating portion is operated while rotating said brake lever in said cable releasing direction from said interior position to said exterior position, an abutment of said brake lever or said strut against said resilient member is released, thereby permitting a passage of said free end of said brake lever.

6. The brake cable connecting apparatus as in claim 3, in which an operating portion that makes said resilient member deform is formed on said resilient member, when said operating portion is operated while rotating said brake lever in said cable releasing direction from said interior position to said exterior position, an abutment of said brake lever or said strut against said resilient member is released, thereby permitting a passage of said free end of said brake lever.

* * * * *